C. C. YZNAGA.
AIR COMPRESSOR.
APPLICATION FILED JUNE 8, 1918.
1,304,489.
Patented May 20, 1919.
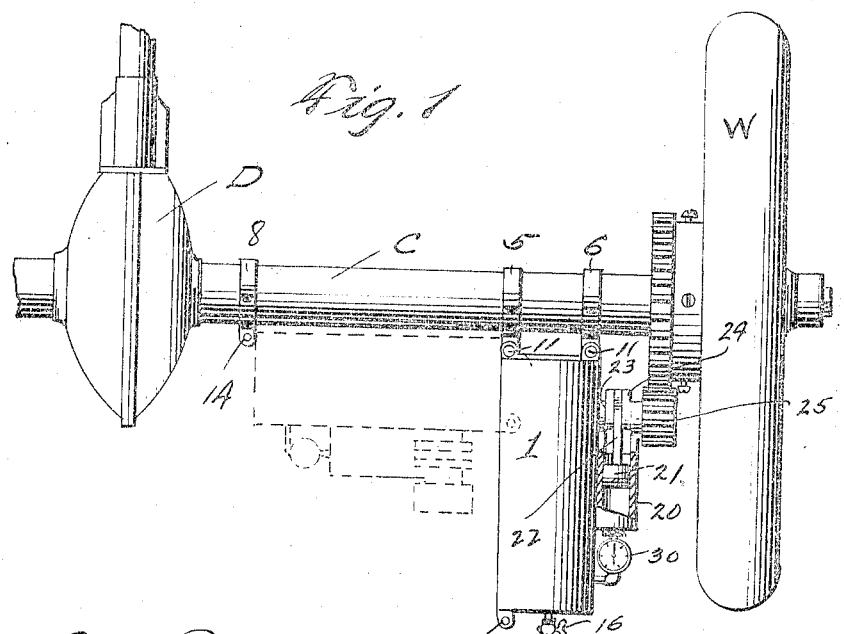
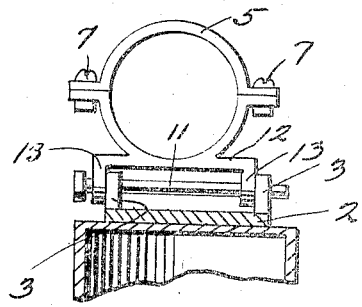
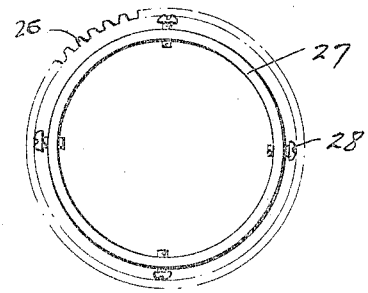
INVENTOR
Cecil C. Yznaga
WITNESSES
BY
ATTORNEY

UNITED STATES PATENT OFFICE.

CECIL C. YZNAGA, OF SEBASTIAN, TEXAS.

AIR-COMPRESSOR.

1,304,439.   Specification of Letters Patent.   Patented May 20, 1919.

Application filed June 8, 1918. Serial No. 238,951.

*To all whom it may concern:*

Be it known that I, CECIL C. YZNAGA, a citizen of the United States, residing at Sebastian, in the county of Cameron and State of Texas, have invented certain new and useful Improvements in Air-Compressors, of which the following is a specification.

This invention relates to air pumps, and more especially to those having a solid piston; and the object of the same is to produce an air compressor for use on an automobile.

The invention consists primarily in a tank movably attached to the axle casing, a pump alongside the same, and gearing connections between the drive shaft of the pump and the hub of a wheel whereby when the parts are thrown into operative position air may be stored in the tank for further use.

The invention also consists in minor details of construction, all of which will be set forth in the following specification and claims and are shown in the drawings wherein:—

Figure 1 is a plan view of one end of the rear axle of an automobile with this invention applied, showing the same in active position in full lines and out of active position in dotted lines, Fig. 2 is an enlarged sectional detail of the inner end of the tank, Fig. 3 is an enlarged sectional detail of the toothed band for application to the wheel hub.

As for the automobile, we are interested only in the casing C of the axle at one side of the differential D, and with one driving wheel W, concerning which parts no invention has been made.

Coming now to the details of the present invention, the numeral 1 designates a tank having near its inner end a yoke 2 provided with two eyes 3 and at its outer end a single eye 4. 5 and 6 are clips made in two parts as shown in Fig. 2, and adapted to be supported on the axle casing C by means of bolts 7, these clips having yokes 12 whereof each has two eyes 13 adapted to aline with the eyes 3 for the reception through the eyes of a pin 11 as best shown in Fig. 2. Another clip 8 is secured upon the casing C near the differential D, and this clip has an eye 14 adapted to register with the single eye 4 at the outer end of the tank 1 when the latter is swung to the position indicated in dotted lines in Fig. 1, and at this time another pin inserted through these eyes holds the tank in this position. It is clear that by removing the pin 11 from the outermost clip 6 and swinging the tank, the same pin can be utilized to lock the tank in its inactive position parallel with a nipple 16 and valve 15 so that a hose may be slipped over the former and the flow of air controlled by the latter, and obviously the hose can be led to a tire which is to be filled or to any other point where compressed air is desired.

The pump comprises a cylinder 20, a piston 21 reciprocating therein, a piston rod 22, and a shaft 23 having a crank 24 with which said rod is engaged; and on the outer end of the shaft is a pinion 25 adapted to mesh with a ring of gear teeth 26 carried by a band 27 which is provided with set screws 28 as best seen in Fig. 3. This band is adapted to be slipped over and fastened upon the hub of the wheel W when the latter is off the axle, and then it can be replaced. Obviously, turning of the wheel causes turning of the toothed band, and the meshing of the teeth 26 with the pinion 25 causes rotation of the shaft 23 and of the crank 24 so that the piston 21 is reciprocated within the cylinder and air pumped into the tank in a manner which will be clear. This may occur while the machine is running, but I prefer at this time to swing the device to the inactive position indicated in dotted lines when the pinion comes out of mesh with the gear teeth and the pump does not operate. When air is needed, the pin 11 is withdrawn and the device swung to active position when the pinion is in mesh with the gear teeth, and then when this end of the axle is jacked up and the wheel rotated by driving the motor, air will quickly be stored under pressure in the tank and can be withdrawn through the nipple and hose for use where desired, or, it is quite possible to permit the parts to remain in active position so that as the car is progressing air will be stored in the tank to be used later when desired. In that case the tank ought to be provided with a safety-valve (not shown), and in any case it is preferably provided with a gage as indicated at 30. The parts are of any desired sizes, proportions, and shapes, and changes may be made without departing from the principle of my invention.

The foregoing description and the drawings have reference to what may be considered the preferred, or approved, form of my invention. It is to be understood that I may make such changes in construction and arrangement and combination of parts, materials, dimensions, et cetera, as may prove expedient and fall within the scope of the appended claims.

Having thus fully described my invention, what I claim as new and desire to secure by Letters Patent, is:—

1. In an air compressor, the combination with a tank having a valved outlet, a pump whose cylinder is mounted alongside the tank, and means for reciprocating the pump-piston; of a pair of supports for one end of the tank to which it is pivotally attached, the pivot pin being removable, and a third support for the remote end of the tank adapted to receive the same pin when removed from one of said first-named supports.

2. In an air compressor, the combination with a tank having a valved outlet, a pump whose cylinder is mounted alongside the tank, and means for reciprocating the pump-piston; of an axle casing, three clips mounted thereon and having eyes, two eyes carried by one end of the tank, pins removably engaging said eyes and those on two of said clips, and a single eye carried by the remote end of the tank and adapted to aline with the eye in the remaining clip for receiving a pin, for the purpose set forth.

3. In an air compressor for automobiles, the combination with the axle casing, a driving wheel, and a band of gear teeth adapted for attachment to the hub of the latter; of a tank hingedly mounted on said casing, a pump whose cylinder is carried by the tank and swings with it, a piston within said cylinder, a crank shaft for driving said piston, and a pinion on the shaft adapted to mesh with said gear teeth when the tank and pump are swung to one position and to move out of mesh when the parts are swung to the opposite position, for the purpose set forth.

4. In an air compressor for automobiles, the combination with the axle casing, a driving wheel, and a band of gear teeth adapted for attachment to the hub of the latter; of a plurality of eyes carried by said casing, a tank, two eyes in one end of the tank and one in the other, removable pins connecting said two eyes with two of those on the casing to hold the tank in position with said pinion in mesh with said gear teeth, and the remaining eye of the tank adapted to register with the remaining eye on the casing to hold said pinion out of mesh, for the purpose set forth.

5. In an air compressor for automobiles, the combination with the axle casing and the driving wheel; of a toothed band for detachable connection with said wheel, a tank, a pump, the cylinder thereof carried by the tank, pump-driving mechanism including a pinion adapted to mesh with said toothed band, and a hinge support between the tank and axle casing whereby in one position of the tank and pump its pinion meshes with said band and in another position the pinion is out of mesh with the band, for the purpose set forth.

6. In an air compressor for automobiles, the combination with a band of gear teeth carried by one wheel, and a plurality of supports mounted on the axle casing adjacent said wheel; of a tank pivotally mounted on one of said supports, means for fastening it selectively to either of the other supports for holding it in one of two positions, a pump carried by the tank and communicating with its interior, and pump-driving mechanism including a pinion for engagement with said gear ring in one position of the tank only, as described.

7. In an air compressor for automobiles, the combination with a driving gear adapted to be rotated by the turning of one main wheel; of a tank hingedly supported from the running gear of the machine, a pump carried by the tank and communicating with its interior, pump-driving mechanism including a pinion, and means for fastening said tank selectively in either of two positions to throw the pinion into mesh with the driving gear or out of such mesh, for the purpose set forth.

In testimony whereof I affix my signature in presence of two witnesses.

CECIL C. YZNAGA.

Witnesses:
J. A. YZNAGA,
ALBERTO PEREZ.